Jan. 16, 1962   G. KLEMT ETAL   3,016,799
WIDE-ANGLE PHOTOGRAPHIC OR CINEMATOGRAPHIC OBJECTIVE
Filed Aug. 19, 1959
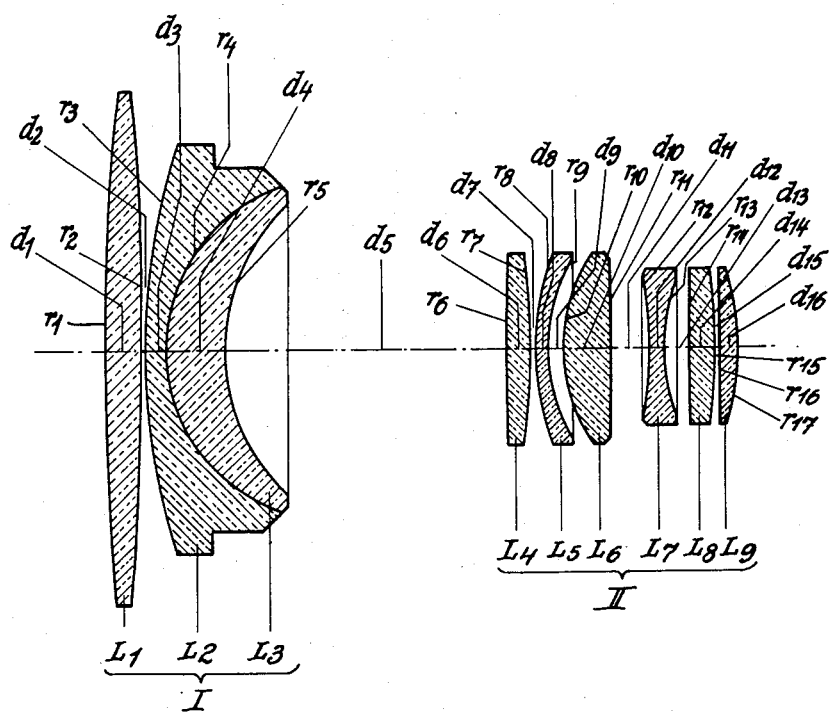
INVENTORS:
Günter KLEMT
Karl MACHER
BY
Karl F. Ross
Agent

3,016,799
WIDE-ANGLE PHOTOGRAPHIC OR CINEMATOGRAPHIC OBJECTIVE
Günter Klemt and Karl Macher, Kreuznach, Rhineland, Germany, assignors to Jos. Schneider & Co., Kreuznach, Rhineland, Germany, a company of Germany
Filed Aug. 19, 1959, Ser. No. 834,834
Claims priority, application Germany Sept. 23, 1958
3 Claims. (Cl. 88—57)

Our present invention relates to a wide-angle photographic or cinematographic objective system of the type in which the back-focal distance exceeds the overall focal length of the system. Such systems, which are particularly adapted for use in reflex-type cameras, generally consist of a negatively refracting front component and a positively refracting rear component separated from the former by a large air space.

It is an object of this invention to provide a system of the above character in which the zone of spherical aberration is appreciably reduced in comparison with similar objectives of the prior art.

Another object of our invention is to provide an improved objective of this type characterized by better definition and sharper contrasts.

We have found, in accordance with this invention, that the foregoing objects are realizable in an optical objective whose front component consists of two air-spaced members in the manner of a greatly modified Taylor objective, the two components being separated from each other by an air space ranging between 40% and 50% of the total physical length of the system by so designing the rear component that its first member, a positive singlet, is followed by a pair of lenses of alternate refractivity whose separating air space is bounded by two surfaces which are convex toward the front component and axially spaced by a distance greater than 6% of the overall focal length of the system, the positive lens of the pair being positioned behind this air space and having an axial thickness less than 20% of the overall focal length.

According to another feature of our invention, the last two members of the multi-lens rear component are positive singlets whose radii of curvature alternate in sign and have absolute magnitudes all exceeding the overall focal length.

The sole FIGURE of the accompanying drawing shows an optical objective system embodying the invention.

The system shown in the drawing consists of a front component I and a rear component II separated from each other by a large air space $d_5$. Front component I is composed of a biconvex singlet $L_1$, having radii $r_1$, $r_2$ and thickness $d_1$, and two meniscus-shaped lenses $L_2$ (radii $r_3$, $r_4$ and thickness $d_3$), $L_3$ (radii $r_4$, $r_5$ and thickness $d_4$) cemented together to form a dispersive doublet separated from lens $L_1$ by an air space $d_2$. Rear component II consists of six single lenses $L_4$ (radii $r_6$, $r_7$ and thickness $d_6$), $L_5$ (radii $r_8$, $r_9$ and thickness $d_8$), $L_6$ (radii $r_{10}$, $r_{11}$ and thickness $d_{10}$), $L_7$ (radii $r_{12}$, $r_{13}$ and thickness $d_{12}$), $L_8$ (radii $r_{14}$, $r_{15}$ and thickness $d_{14}$) and $L_9$ (radii $r_{16}$, $r_{17}$ and thickness $d_{16}$) which are separated from one another by air spaces $d_7$, $d_9$, $d_{11}$, $d_{13}$ and $d_{15}$. Air space $d_{11}$ may accommodate a diaphragm (not shown) and divides the component II into a front group $L_4$, $L_5$, $L_6$ and a rear group $L_7$, $L_8$, $L_9$.

Representative numerical values for the radii $r_1$ to $r_{17}$ and the thicknesses and separations $d_1$ to $d_{16}$ of lenses $L_1$ to $L_9$, based upon a numerical value of 100 units for the overall focal length of the system, are given together with their refractive indices $n_d$ and Abbé numbers $v$ in the following table which characterizes an objective system having a relative aperture of 1:2.0 and a back-focal distance of 126.9.

| Lens | Radii | Thicknesses and Air Spacings | $n_d$ | $v$ |
|---|---|---|---|---|
| $L_1$ | $r_1 = +\ 1,451.90$ | $d_1 = 16.43$ | 1.52630 | 51.00 |
|  | $r_2 = -\ 1,451.90$ | $d_2 = 2.49$ | air space |  |
| $L_2$ | $r_3 = +\ 263.32$ | $d_3 = 9.03$ | 1.71700 | 47.90 |
| $L_3$ | $r_4 = +\ 67.70$ | $d_4 = 24.93$ | 1.61293 | 36.95 |
|  | $r_5 = +\ 78.34$ | $d_5 = 123.04$ | air space |  |
| $L_4$ | $r_6 = +\ 458.38$ | $d_6 = 12.01$ | 1.69968 | 34.95 |
|  | $r_7 = -\ 297.45$ | $d_7 = 0.33$ | air space |  |
| $L_5$ | $r_8 = +\ 104.55$ | $d_8 = 6.02$ | 1.62364 | 36.75 |
|  | $r_9 = +\ 68.55$ | $d_9 = 6.22$ | air space |  |
| $L_6$ | $r_{10} = +\ 66.49$ | $d_{10} = 19.63$ | 1.71700 | 47.90 |
|  | $r_{11} = +\ 15,706.80$ | $d_{11} = 18.00$ | air (diaphragm) space |  |
| $L_7$ | $r_{12} = -\ 165.15$ | $d_{12} = 5.79$ | 1.78470 | 26.10 |
|  | $r_{13} = +\ 76.77$ | $d_{13} = 10.47$ | air space |  |
| $L_8$ | $r_{14} = +\ 991.49$ | $d_{14} = 11.78$ | 1.71300 | 53.89 |
|  | $r_{15} = -\ 239.62$ | $d_{15} = 0.59$ | air space |  |
| $L_9$ | $r_{16} = +\ 876.30$ | $d_{16} = 10.21$ | 1.71300 | 53.89 |
|  | $r_{17} = -\ 102.45$ | $d_{total} = 276.97$ |  |  |

From the foregoing table it will be seen that the air space $d_9$, separating the negative second lens $L_5$ of the rear component from its positive third lens $L_6$, has a magnitude of 6.22 and is thus greater than 6% of the overall focal length; the thickness $d_{10}$ of this third lens $L_6$, given as 19.63, is less than 20% of the overall focal length. The radii $r_{14}$ to $r_{17}$ of the last two positive lenses $L_8$, $L_9$ of component II, which are of alternately positive and negative sign, all have absolute values greater than 100, thus exceeding the overall focal length of the system.

Our invention is, of course, not limited to the specific configurations or the exact numerical values disclosed but may be realized in various modifications without departing from the spirit and scope of the appended claims.

We claim:

1. A wide angle objective system consisting of a negatively refracting front component and a positively refracting rear component separated from said front component by a large air space ranging between 40% and 50% of the total physical length of the system, said front component consisting of two air-spaced members of alternate refractivity including a single positive front lens and a meniscus-shaped doublet following said front lens, said doublet being composed of a negative front meniscus of higher refractive index and a positive rear meniscus of lower refractive index having a forwardly convex cemented surface therebetween, said rear component consisting of at least five air-spaced members including a positive first member closest to said air space, a negative second member following said first member, and a positive third member following said second member, said second and third members being separated from each other by an air space bounded by two surfaces which are convex toward said front component, said surfaces being separated by an axial distance greater than 6% of the overall focal length of the system, said third member having a thickness less than 20% of said overall focal length, the members of said rear component further including a positive penultimate lens member and a positive final lens member having radii of curvature alternating in sign, all of said radii having absolute values greater than said overall focal length.

2. A system according to claim 1 wherein the members of said rear component are divided into a front group and a rear group of three singlets each by a diaphragm space exceeding the separations of said members within each of said groups, said front group consisting of said first, second and third members, said rear group consisting of a fourth member, said penultimate lens member and said final lens member.

3. A system according to claim 2 wherein the numerical values of the radii $r_1$ to $r_{17}$ and of the thicknesses and separations $d_1$ to $d_{16}$ of said front lens $L_1$, said front and rear menisci $L_2$, $L_3$, and the six singlets $L_4$ to $L_9$ of said rear component, based upon a numerical value of 100 for the overall focal length of the system, their refractive indices $n_d$ and their Abbé numbers $\nu$ are substantially as given in the following table:

| Lens | Radii | Thicknesses and Air Spacings | $n_d$ | $\nu$ |
|---|---|---|---|---|
| $L_1$ | $r_1 = +1,451.90$ | $d_1 = 16.43$ | 1.52630 | 51.00 |
|  | $r_2 = -1,451.90$ | $d_2 = 2.49$ | air space |  |
|  | $r_3 = +263.32$ |  |  |  |
| $L_2$ |  | $d_3 = 9.03$ | 1.71700 | 47.90 |
|  | $r_4 = +67.70$ |  |  |  |
| $L_3$ |  | $d_4 = 24.93$ | 1.61293 | 36.95 |
|  | $r_5 = +78.34$ |  |  |  |
|  |  | $d_5 = 123.04$ | air space |  |
|  | $r_6 = +458.38$ |  |  |  |
| $L_4$ |  | $d_6 = 12.01$ | 1.69968 | 34.95 |
|  | $r_7 = -297.45$ |  |  |  |
|  |  | $d_7 = 0.33$ | air space |  |
|  | $r_8 = +104.55$ |  |  |  |
| $L_5$ |  | $d_8 = 6.02$ | 1.62364 | 36.75 |
|  | $r_9 = +68.55$ |  |  |  |
|  |  | $d_9 = 6.22$ | air space |  |
|  | $r_{10} = +66.49$ |  |  |  |
| $L_6$ |  | $d_{10} = 19.63$ | 1.71700 | 47.90 |
|  | $r_{11} = +15,706.80$ |  |  |  |
|  |  | $d_{11} = 18.00$ | air (diaphragm) space |  |
|  | $r_{12} = -165.15$ |  |  |  |
| $L_7$ |  | $d_{12} = 5.79$ | 1.78470 | 26.10 |
|  | $r_{13} = +76.77$ |  |  |  |
|  |  | $d_{13} = 10.47$ | air space |  |
|  | $r_{14} = +991.49$ |  |  |  |
| $L_8$ |  | $d_{14} = 11.78$ | 1.71300 | 53.89 |
|  | $r_{15} = -239.62$ |  |  |  |
|  |  | $d_{15} = 0.59$ | air space |  |
|  | $r_{16} = +876.30$ |  |  |  |
| $L_9$ |  | $d_{16} = 10.21$ | 1.71300 | 53.89 |
|  | $r_{17} = -102.45$ |  |  |  |

References Cited in the file of this patent
UNITED STATES PATENTS

| | | |
|---|---|---|
| 2,629,285 | Baker | Feb. 24, 1953 |
| 2,785,603 | Cook | Mar. 19, 1957 |
| 2,816,482 | Lange | Dec. 17, 1957 |